United States Patent [19]

Aul et al.

[11] Patent Number: 4,919,882
[45] Date of Patent: Apr. 24, 1990

[54] MODULAR NUCLEAR STEAM SUPPLY SYSTEM AND METHOD OF CONSTRUCTING A NUCLEAR REACTOR USING A MODULAR NUCLEAR STEAM SUPPLY SYSTEM

[75] Inventors: Raymond J. Aul; Robert L. Howell; Lawrence W. Ramsey, all of Jacksonville, Fla.

[73] Assignee: Westinghouse Electric Corp., Pittsburgh, Pa.

[21] Appl. No.: 544,193

[22] Filed: Oct. 21, 1983

[51] Int. Cl.$^5$ .............................................. G21C 13/00
[52] U.S. Cl. ...................................... 376/293; 376/912
[58] Field of Search ................... 52/345; 60/643, 645, 60/669, 720, 721; 376/260, 261, 262, 273, 293, 909, 912; 405/195, 203, 204, 205, 207, 209

[56] References Cited

U.S. PATENT DOCUMENTS

| | | | |
|---|---|---|---|
| Re. 30,280 | 5/1980 | Berman et al. | 290/1 R |
| 1,310,461 | 7/1919 | Williams | 405/204 |
| 3,011,317 | 12/1961 | Wolff | 405/207 |
| 3,262,411 | 7/1966 | Kaltenecker | 405/207 |
| 3,793,145 | 2/1974 | Jordan et al. | 376/293 |
| 3,794,849 | 2/1974 | Perry et al. | 376/912 |
| 3,962,877 | 6/1976 | Schiemichen | 405/203 |
| 3,986,367 | 10/1976 | Kalpins | 52/167 |
| 4,009,676 | 3/1977 | Kura | 376/909 |
| 4,206,013 | 6/1980 | Dickey | |
| 4,293,240 | 10/1981 | Ogimoto et al. | 60/724 |
| 4,355,001 | 10/1982 | Pierart | 376/909 |

FOREIGN PATENT DOCUMENTS

| | | | |
|---|---|---|---|
| 0061573 | 10/1982 | European Pat. Off. | |
| 52-14045 | 2/1977 | Japan | 405/203 |
| 1429685 | 3/1976 | United Kingdom | 376/262 |
| 1454291 | 11/1976 | United Kingdom | 376/912 |
| 8000893 | 5/1980 | World Int. Prop. O. | |

OTHER PUBLICATIONS

Dotson et al., Offshore Nuclear Power Plants, Nuclear Engineering and Design 25 (1973) 334–349.

Primary Examiner—Deborah L. Kyle
Assistant Examiner—Richard W. Wendtland

[57] ABSTRACT

A method and apparatus for fabricating a nuclear reactor and a preformed containment building for a nuclear reactor. The nuclear steam supply system (NSSS) is assemblied at a manufacturing site while the containment building is constructed in parallel at the reactor site. The completed NSSS is then transported to the reactor site and installed in the specially formed containment building. The NSSS and its safeguards system preferably are formed as a low draft barge which is tugged to the reactor site along navigable waterways.

17 Claims, 5 Drawing Sheets

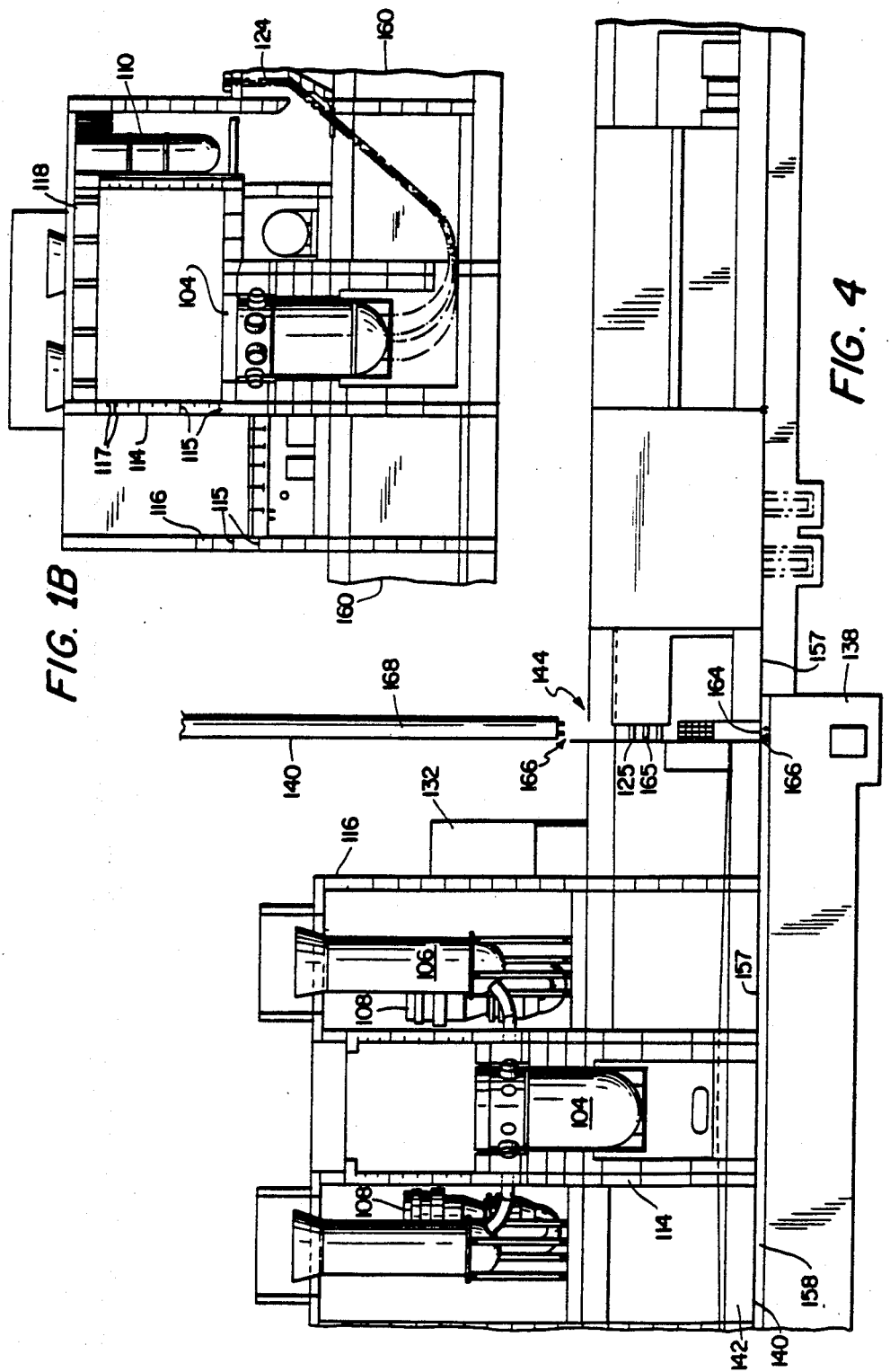

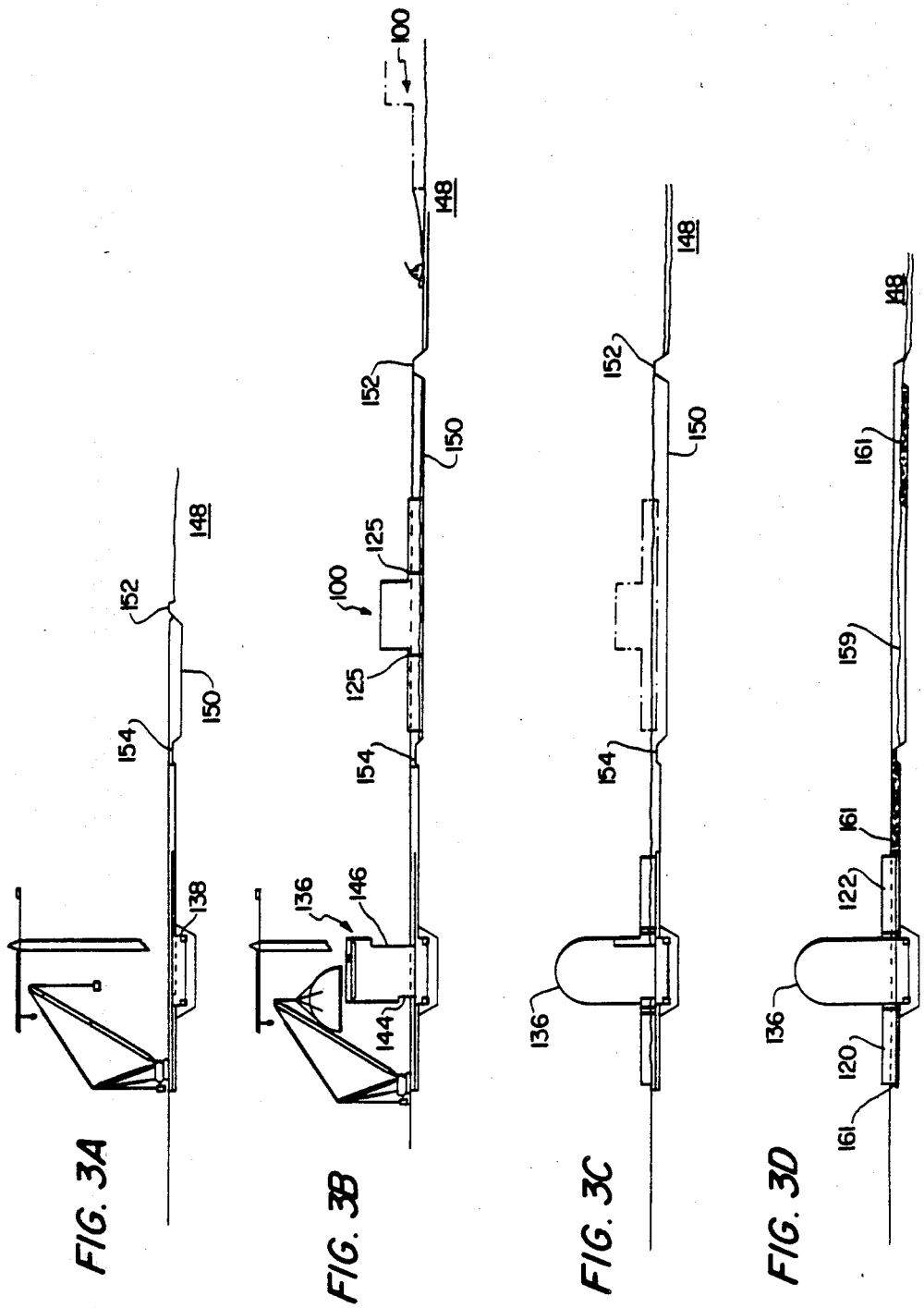

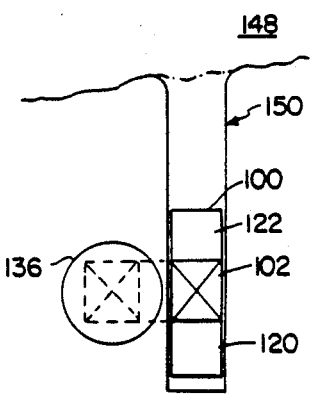
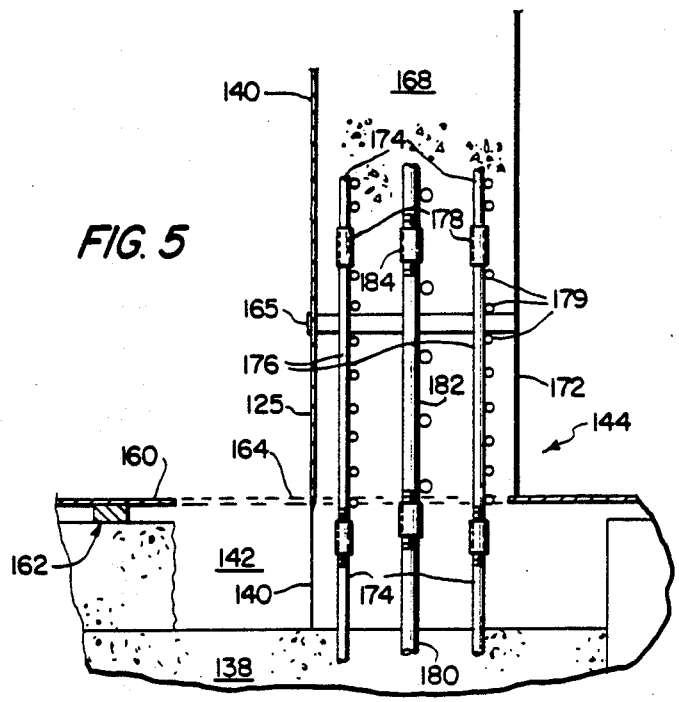
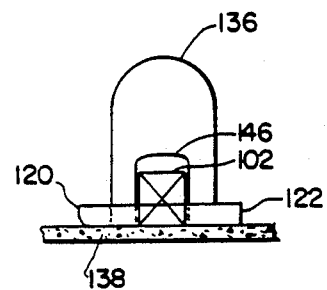
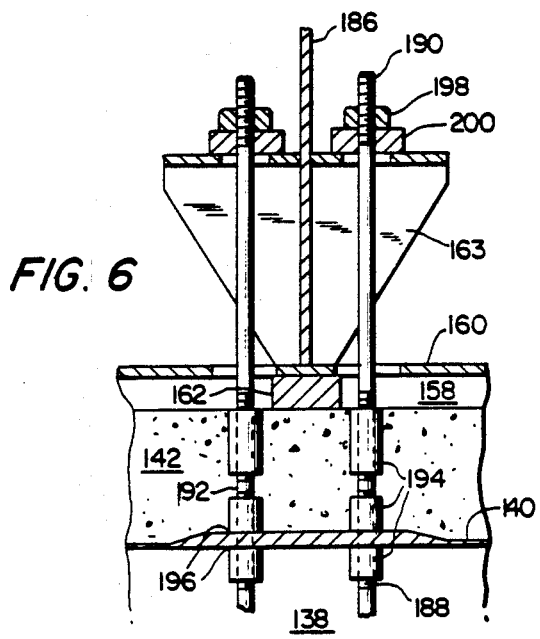

MODULAR NUCLEAR STEAM SUPPLY SYSTEM AND METHOD OF CONSTRUCTING A NUCLEAR REACTOR USING A MODULAR NUCLEAR STEAM SUPPLY SYSTEM

BACKGROUND OF THE INVENTION

1. Field of the Invention

The present invention relates to a modular nuclear steam supply system (NSSS module) and to a method for combining an NSSS module with a prefabricated containment shell. More specifically, the invention relates to a complete NSSS module which can be transported along navigable waterways and installed as a unit in a semi-completed conventional containment shell. The United States Government has rights in this invention pursuant to Contract No. DOE 74-9359 between the U.S. Department of Energy and Westinghouse Electric Corporation (41 CFR 9-9.109 (i) (5) (ii) (B)).

2. Description of the Prior Art

Conventional nuclear reactors are constructed on site by erecting a containment shell and then constructing an NSSS and reactor safeguards system within the containment. Additional auxiliary equipment may be positioned in, or in buildings adjacent to, the containment. In many instances, large portions of the NSSS reactor safeguard system and containment are uniquely designed for each reactor. Such customizing may result in significant development expenses and design delays. Moreover, each new reactor design or modified design is subject to extensive testing and to extensive scrutiny for required construction and operating licensing purposes.

Dickey, in U.S. Pat. No. 4,206,013 discloses an offshore nuclear power generating facility that utilizes a standardized reactor. Additional offshore nuclear power plant designs are discussed in an article entitled "Offshore Nuclear Power Plants", 25 Nuclear Engineering Design 334–349 (1973) and Nuclear Engineering International, June 1973.

Such offshore reactors are erected on platforms which are typically about 400 feet long and 400 feet wide and which require a draft of over 35 feet. Clearly, such systems cannot be used to service many coastal sites or sites adjacent all but a few inland waterways.

Therefore, a need exists for a prefabricated nuclear reactor designed to service those areas which cannot be serviced by existing offshore installation designs but which have access to navigable waterways.

SUMMARY OF THE INVENTION

It is therefore an object of the present invention to provide an NSSS module and a method of installing the module in a prefabricated land-based containment building It is a further object of the present invention to provide a module having all necessary NSSS and reactor safeguard systems and which can be readily transported to a semi-completed containment building to fabricate a complete nuclear power plant.

It is a still further object of the present invention to provide a method for reducing the time required to assemble, inspect and test a complete NSSS and use it to construct a nuclear reactor.

In accordance with one embodiment of the invention, a method for fabricating a nuclear reactor is provided which comprises the steps of manufacturing a nuclear steam supply system (NSSS) module at a manufacturing site while simultaneously constructing a specialized containment building at the reactor site, the containment building having at least one construction opening. The module is then transported to the reactor site and at least a portion of the module is installed in the containment building through the construction opening. The containment building is then completed by closing the construction opening.

Preferably, the NSSS module includes an NSSS portion and a reactor safeguards equipment portion and the containment building has two construction openings on opposite sides thereof, one of the openings being dimensioned to accommodate the passage of the reactor safeguards equipment portion of the module and the other opening being dimensioned to accommodate the passage of the NSSS portion of the module.

Preferably, a base mat is provided in the containment building for supporting the NSSS portion and structural forms are provided on the module for sealing the construction openings.

In accordance with one embodiment of the invention, the module comprises a barge and the step of transporting and installing the module further comprises transporting the barge to the reactor site along a navigable waterway and aligning a fore potion of the barge with a construction opening in the containment building. The NSSS portion of the module is then positioned in the containment building by floating the barge at least partially through the containment building. The construction opening is then closed while completing the assembly of the NSSS portion. Preferably, the barge will be floated through a first construction opening in the containment building and at least partially through a second opening, positioned generally opposite to the first opening, whereby the fore section of the barge extends through the second construction opening. In this embodiment, both construction openings will be completed while completing the assembly of the NSSS portion.

In accordance with another preferred embodiment of the invention, the barge can be floated into a position adjacent the containment building and the NSSS portion transferred from the barge into the containment building through the construction opening. The construction opening is then closed while completing the NSSS portion of the barge.

In another aspect of the invention, a nuclear steam supply system module is provided comprising a low draft barge having an NSSS portion and an associated reactor safeguard system portion where the NSSS portion is adapted to fit within a preformed containment building having a liner with at least one opening dimensioned to pass the NSSS portion. The barge has at least one bulkhead separating the NSSS portion from the reactor safeguard system and formed to cooperate with the liner to close the construction opening. The bulkhead contains preformed reactor penetrations for communicating with the safeguard systems. Preferably, the barge has a draft of less than 10 feet and is dimensioned so as to be able to pass through navigable waterways and beneath bridges or the like.

It is advantageous that the NSSS portion and the safeguard systems portion of the barge are separable at the bulkhead so that they may be structurally separated at the site into separate freestanding buildings for seismic purposes.

Preferably, the portion of the bottom deck of the barge, which is coextensive with the NSSS portion of the module, forms that portion of the containment vessel liner which is positioned above the base mat on which the containment building is erected.

Advantageously, the NSSS portion of the module comprises a primary shield wall, a secondary shield wall and a refueling canal each of which is formed from structural steel and adapted to be filled with shielding material such as concrete after the NSSS portion of the module is positioned within the containment building.

In another aspect of the invention, a containment building for accepting a nuclear steam supply system (NSSS) module is provided which comprises a base mat, a domed cylindrical shell having a liner and positioned on the base mat, and at least one opening in the shell for passing an NSSS module therethrough.

Preferably, the containment building further includes a second opening in the shell positioned generally opposite the first opening for passing the fore section of a barge associated with the NSSS portion of the module at least partially through the shell.

It should be appreciated that the NSSS module of the present invention comprises a virtually complete nuclear steam supply system, and a complete safeguards system package and includes all necessary containment penetrations, a primary shield, a secondary or outer shield, a refueling canal and other related structures, equipment, supports and restraints.

The present invention may utilize a conventional post-tensioned containment building that contains either one or two large construction openings for accommodating the NSSS module.

The present NSSS module design, coupled with the containment building design defined in this disclosure, permits construction of the containment building to proceed in parallel with the manufacture of an NSSS module thereby reducing the overall construction schedule of the nuclear power plant.

The overall dimensions and draft of the NSSS module permit its transport, without disassembly, to potential sites along many coastal, intercoastal, and inland sites.

The weight and center of gravity of the present NSSS module results in a stable floating configuration.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

The accompanying drawings, which are incorporated in and form a part of the specification, illustrate the preferred embodiment of the present invention and, together with the description, serve to explain the principles of the invention. In the drawings:

FIG. 1B is a section through section lines BB of FIG. 1;

FIGS. 3A-3D illustrate a schematic representation of a first preferred construction sequence of a nuclear reactor using an NSSS module according to the invention;

FIG. 4 is a partial sectional view of a module positioned in a preformed containment building indicating typical closing and anchoring points;

FIG. 5 is a partial, sectional view of a containment wall illustrating the closing of the containment building after NSSS module installation;

FIG. 6 is a partial section through an NSSS module illustrating a preferred method of anchoring of the module to a base mat; and FIGS. 7A and 7B illustrate an alternative reactor construction sequence.

DETAILED DESCRIPTION OF THE INVENTION

An important aspect of the present invention is the provision of an NSSS module which can be delivered from a manufacturing facility to a plant site, and installed as a unit into a specially designed containment shell constructed at the plant site.

As explained in detail below, a typical module consists of a reactor vessel, steam generators, reactor coolant pump casings, pressurizer and associated piping. In addition, the module may contain a primary shield, refueling canal, outer shield wall and all necessary component supports.

After completion, the module is transported as a barge with overall dimensions and draft such that potential sites serving 60 percent of the U.S. population can be reached.

It is important to appreciate that the containment shell construction and NSSS module assembly proceed in parallel and at different locations. The module is assembled in a manufacturing environment (to afford maximum efficiency and quality control) while the reactor containment building is constructed at the reactor site utilizing conventional methods.

Figure 1:
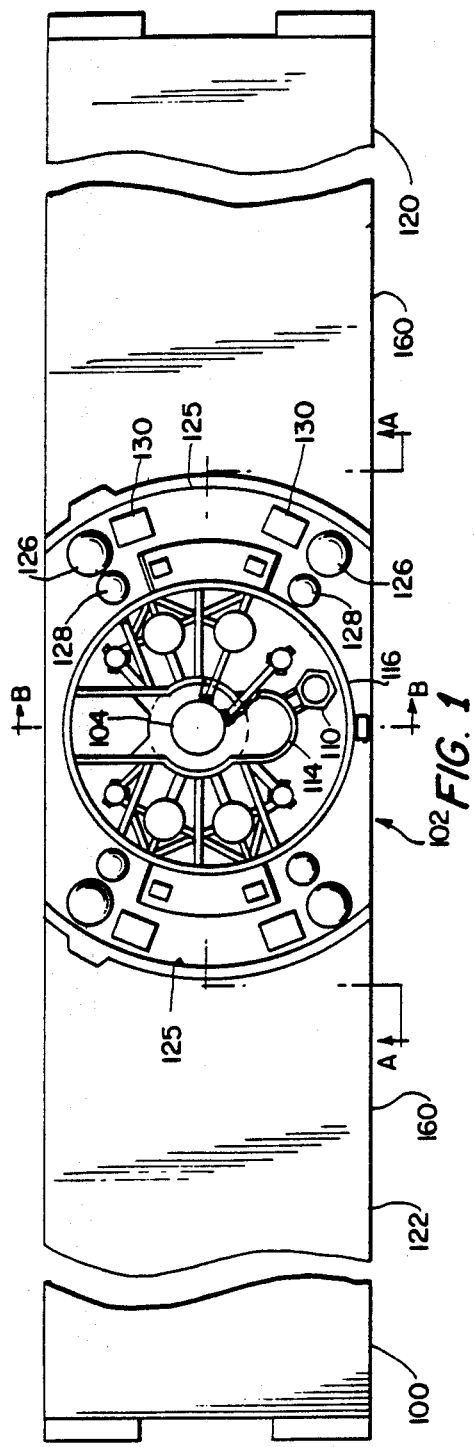
FIG. 1 is a top elevation of an NSSS module according to the present invention.
Figure 1A:
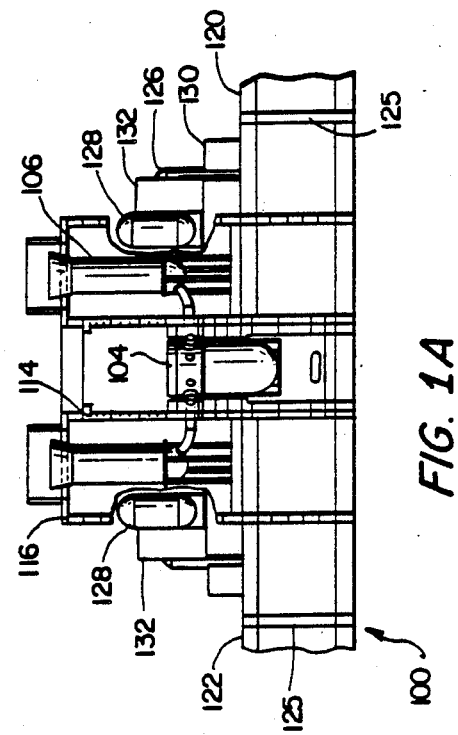
FIG. 1A is a partial section through section lines AA of FIG. 1 illustrating some module components in cutaway.

Turning first to FIGS. 1A and 1B, there is depicted a module in the form of a barge 100 having thereon an NSSS portion 102. The NSSS portion of the module comprises a reactor pressure vessel 104 without head or internals (which are installed after the NSSS is installed on site). In the embodiment illustrated, only the lower halves 106 of the four steam generators are installed in the module to reduce the overall height of the module. The NSSS portion of the module depicted in FIG. 1A is a schematic representation of a standard Westinghouse 4-loop NSSS but it should be appreciated that the module can be constructed as any other type of pressurized water reactor, boiling water reactor, or liquid metal fast breeder reactor. The standard NSSS portion of the module illustrated may further include reactor coolant pump casings 108, pressurizer 110, and pressurizer relief tank 112 (FIG. 1B).

The structural steel for primary shield 114, secondary shield 116 and refueling canal 118 of the reactor is included in the module. However, as will be understood by the artisan, it is preferable to pour the concrete for the shields and refueling canal after the NSSS portion of the module is in place in the containment building in order to reduce the weight of the barge and thereby reduce its draft. The concrete is for radiation shielding only. No forming is required for the concrete since the structural steel walls provide this function. Strengthening and reinforcing ribs 115 and 117 may be included between the various shield walls.

All of the piping, electric wiring, ventilator or other shield or containment penetrations 165 (FIG. 4) are preferably installed at the manufacturing site where they can be more efficiently installed and tested, thus reducing the overall man-hours required to produce the reactor. Appropriate hookups are provided on the safeguards side of the containment for communication with the piping and wiring penetrations. Moreover, all supports and constraints associated with the piping, wiring, ventilation and other shield or containment penetrations are preferably installed at the manufacturing facility. Preferably, any component or connection that can be installed at the manufacturing plant is included in the module to minimize the amount of work required at the reactor site.

A major advantage of the modular system of the present invention is the reduction in the overall plant construction schedule made possible by the assembly, inspection and testing of a virtually complete nuclear steam supply system and safeguards system package at a manufacturing facility while the parallel construction of a conventional dry type containment and foundation mat proceeds at the reactor site.

After the NSSS portion of the module has been positioned within the containment building in the manner explained below, it is anchored to a base mat. For seismic reasons, the fore and aft ends 120, 122 of the module outside the containment building are structurally separated from the NSSS portion of the module by separating the hull plate 160 from the bulkhead 125 where the bulkhead passes through and forms a part of the containment building The containment building is then completed in the manner detailed below with regard to FIG. 4 by installing additional liner plate 140 and reinforced concrete in the construction openings 144, 146. The opening 146 is not visible in FIG. 4 but is closed in the same manner as detailed below with regard to opening 144.

Preferably, all of the auxiliary or safeguards equipment necessary to support a reactor (which is not part of the NSSS portion of the module) is included in the fore and aft sections, 120 and 122, of the barge. Such equipment may include excess letdown and regenerative heat exchangers, safety injection accumulators, emergency diesel generators, switchgear and controls, auxiliary feedwater pumps, component cooling water pumps, component cooling water heat exchangers, instrument air compressors and dryers, containment ventilation equipment, refueling water storage tanks, auxiliary feedwater storage tanks, and safeguards penetrations.

The specific auxiliary and safeguards equipment positioned in the fore and aft sections of the module form no part of the present invention and, except for the safeguard penetrations, are not further discussed herein.

Between the safeguards equipment in the fore and aft portions 120, 122 and the NSSS portion 102 is an installed section of liner plate 125 which contains the above-mentioned mechanical and electrical penetrations for the safeguards equipment. This section of liner plate aligns with the field installed liner plate 140 of the containment building as further explained below.

Preferably, the upper halves of the steam generators 126, and other pieces of equipment are shipped unassembled on the module in order to reduce the overall height of the module to allow it to pass under bridges or the like. This equipment is assembled on site. Of course, equipment such as safety injection and containment spray pumps which, in operation, would generally be located below the plane of the barge bottom, are also preferably shipped on the barge and installed on site.

Other equipment illustrated in FIGS. 1, 1A and 1B includes accumulators 128 and reactor coolant pump motors 130.

Figure 2:
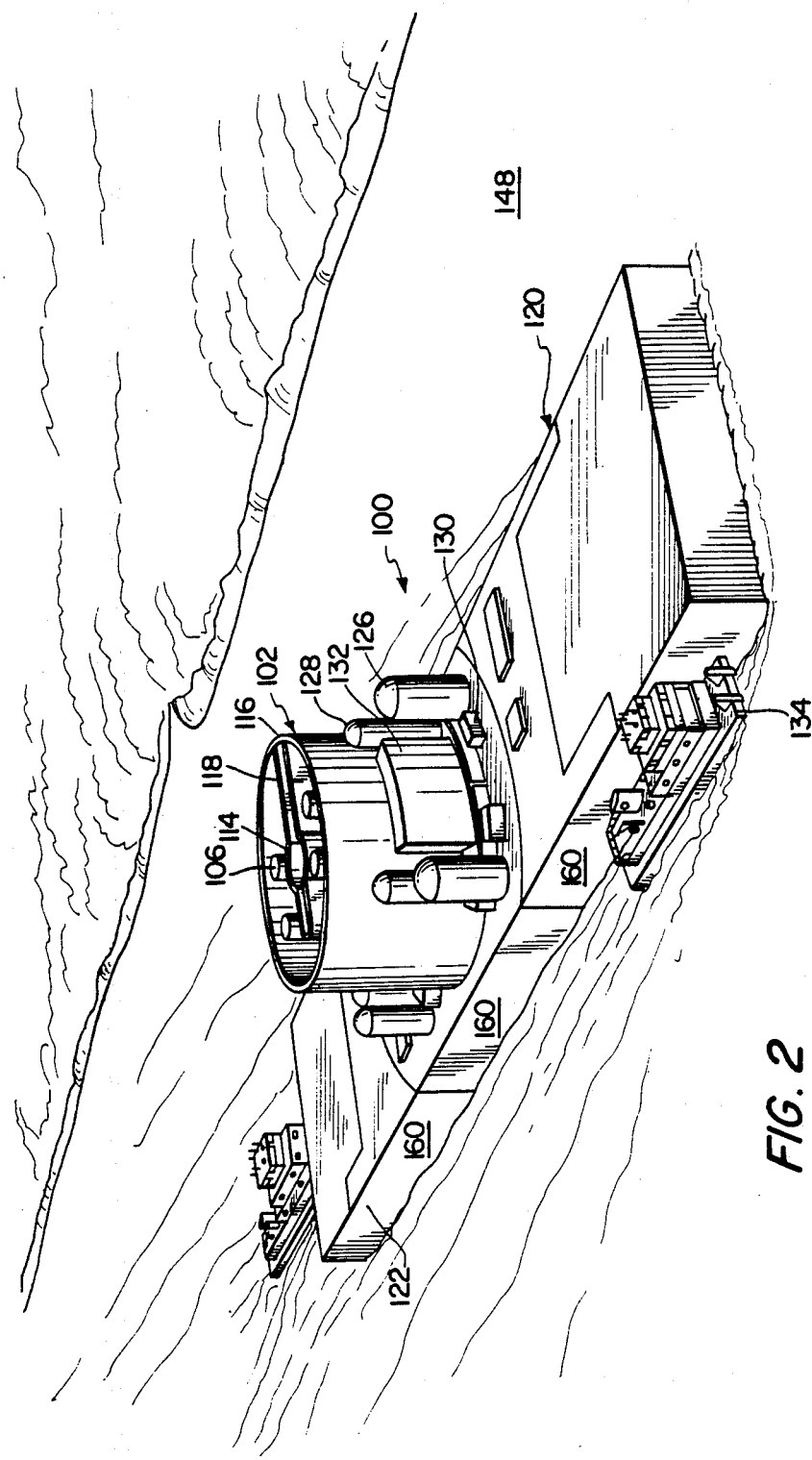
FIG. 2 is a perspective view of a completed module being towed on a navigable waterway.

Since the entire module 100 is used to form the completed reactor plant, it is preferable that the barge not be self-propelled but merely be pushed or towed to the reactor site. FIG. 2 illustrates a completed module being transported to the site. The large vertical cylinder shown in the drawing is the secondary or outer shield wall 116 which surrounds the nuclear steam supply system 102 and a section of the refueling canal 118. The smaller cylinders shown outside the secondary shield wall 116 are the accumulators 12S and the stored upper halves of the steam generators 126. The large rectangular boxes 132 adjacent to the outer shield wall contain containment ventilation equipment and the smaller boxes 130 contain uninstalled reactor coolant pump motors.

A typical module when complete would measure on the order of about 100 feet tall at the center of the NSSS portion and about on the order of about 35 feet tall at the fore and aft sections. The overall width of the barge is typically on the order of about 105 feet with a length of from about 500–600 feet. These overall module dimensions and draft are such that the module can be manufactured in a typical shipyard facility and towed to potential sites such as those along the lower Ohio River, the Mississippi River to St. Louis, the Columbia River to The Dalles, the coastal areas and the Great Lakes.

When the NSSS module arrives at the reactor site, the containment building (FIGS. 3A–3D) is complete with the exception of two large construction openings 144 and 146, generally 180 degrees apart. By diking and flooding, the NSSS module is moved from an adjacent river 148 to a position within the containment building using the larger of the construction openings 146 for passage of the module's fore section 120 and the centrally located NSSS portion 102 of the barge.

FIGS. 3A through 3D schematically illustrate the sequence of major steps involved in completing a reactor plant using the module 100. The containment building 136 is constructed over a base mat 138. The containment building is preferably a post-tensioned type of concrete vessel, which for a conventional PWR NSSS as detailed above, may be on the order of about 150 feet in diameter and 200 feet high. As best seen in FIG. 5, the entire containment vessel is preferably lined with a continuous shell liner plate 140. The liner plate 140 extends across the top of the base mat 138 where it is preferably covered with a reinforced concrete work slab 142 which forms the floor of the containment building and protects the liner plate 140 from damage and corrosion.

A unique feature of the containment building 136 is the two large construction openings 144 and 146 positioned in the containment approximately 180 degrees apart to accommodate positioning and passage of the module 100.

On the side of the containment where the module or barge enters, an opening 146 sufficiently large for the NSSS section to clear is provided. With the exemplary module dimensions discussed above, the opening 146 would be approximately 110 feet wide and 110 feet high. On the opposite side an opening 144 of approximately 110 feet wide and 50 feet high is provided for clearance of the module's fore section. It should be understood that the dimensions of the opening 146 are exemplary only and that the opening need only be dimensioned to provide clearance for the fore section 120 of the module 100.

In accordance with the invention, a reactor site is selected adjacent a navigable waterway 148. Preferably, a holding basin 150 is excavated next to the base mat 138. After the containment building 136 with the openings 144 and 146 is completed, the module 100 is towed to the site and the dike 152 is opened, permitting the module to be towed or pushed into the holding basin 150. The dike 152 is then closed, and the holding basin flooded after which the dike 154 is opened and the module moved into position inside the containment building.

With the module in position, the water is removed and the module is brought to rest preferably on an array of pre-positioned blocks 156 (see FIG. 5). An anchoring system, preferably as etailed below, or equal, is used to secure the module to its foundation mat 138. The blocks 156 provide a space between the module's bottom shell 140 and the foundation mat 138, which is subsequently filled with grout 158.

The curved sections of liner plate 125, which are part of the NSSS portion of the module, function as the load carrying bulkheads when the module is being towed as a barge. In the process of closing the construction openings 144 and 146, hull plates 160 and any longitudinal bulkheads in the area of the liner plate 125 are removed, thus structurally freeing the curved sections of liner plate 125 and structurally disconnecting the fore and aft portions 120, 122 from the central NSSS portion 102. This operation makes room for joining the module liner plate 125 with existing field installed liner plate 140. Preferably, any piping penetrations 165 in this area are not affected as they are built into the plate 125.

After the module liner plate 125 is joined to the field installed plate 140, but before concrete is poured to close the openings 144 and 146, reinforcing bar and tendon ducts are preferably spliced to the existing field work in the opening areas as illustrated in FIG. 5.

After assembly, backfill 161 is used as required to complete the reactor site and form a setting pond 159.

The bottom of the barge 157 is supported by blocks 162 on top of the concrete slab 142. As illustrated in FIG. 5, the barge has been cut at 164 and the curved hull plate 125 from the NSSS module is welded at 166 to the vertical walls of the field installed liner 140. The containment building wall 168 is then closed, preferably using a consumable steel wall form 172 to close the opening 144 and pouring concrete as necessary to fill in the wall. Other temporary forms may be used to close the areas between the module deck and the openings 144 and 146 as well as other construction openings. Preferably, reinforcing dowels 174 or the like extend upwards from the base mat 138 and downward from the wall 168 into the openings 144, 146 to strengthen and post-stress the containment walls. Splice bars 176 are connected to the reinforcing dowels 174 by the use of coupling connectors 178 or the like. Transverse reinforcing dowels 179 may also be used in a conventional manner to reinforce the concrete containment wall 168.

Preferably, empty prestress tendon conduits 180 extend through the base mat 138 from a tendon gallery (not shown) into the opening 144. A splicing conduit 182 and coupling connectors 184 are used to complete conduit on site. After the wall 168 is formed, tesioning wires are threaded through the conduits 182 and subjected to a load to thereby post-stress the containment building concrete in compression.

Depicted in FIG. 6 is an anchor arrangement which may be used to secure the primary shield 114, the secondary shield 116 or the side walls of the fore and aft sections 120, 122 of the barge to the base mat or in the case of the safeguard equipment to a dry mat outside the containment building.

The shield or bulkhead member 186 sits on a block 162 above the concrete work slab 142 and is held against the block 162 by a gusset plate 163. Anchor bolts 188, threaded at the top end, pass through the horizontal bottom portion of the liner plate 140. It should be understood that the bottom of the barge 157 changes function from that of a section of hull plate to containment liner section 100 above the work slab 142 after the NSSS is installed in the containment building. A high strength bolt 190 is held against the gusset plate 163 by fastening means such as nut 198 and flat washer 200 and passes through the gusset plate 163 and liner 160 and into the concrete work slab 142. Connecting the anchor bolts and bolts 190 are splicing bolts 192. The bolts 188, 190 and 192 are preferably coupled with coupling nuts 194 or the like. A welded portion lg6 is preferably provided where the bolts pass through the bottom, horizontal portion of the liner plate 140 for extra strength and rigidity and to lock the lower coupling bolts to the liner plate 140.

Completing the interior of the containment proceeds in parallel with closing the construction openings and anchorage of the module. The upper halves 126 are set in place, the pressurizer and the reactor coolant pump motors and any remaining structures or equipment are installed. Concrete is pumped into both the primary and secondary shield walls to complete those structures.

In an alternate embodiment, the NSSS module may be transported to the work site in the manner illustrated in FIGS. 7A and 7B. In this embodiment, the barge 100 is floated to a position transverse to the containment building 136 and transferred, through a single opening 146, into the containment building. The fore and aft sections, 120 and 122 respectively, housing the auxiliary and safeguards equipment are then moved into their proper positions relative to the containment.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of fabricating a nuclear reactor comprising the steps of:
    manufacturing, at a manufacturing site, a nuclear steam supply system (NSSS) module comprising a barge having a bulkhead with means for reinforcing said bulkhead, an NSSS portion, and a reactor safeguards portion;
    constructing, at a reactor site remote from said manufacturing site and in parallel with said manufacturing step, a containment building have at least one construction opening sized to pass said NSSS portion, a base mat for supporting said NSSS portion, and means for reinforcing said containment building, said bulkhead having a generally complementary geometry with respect to said construction opening;

transporting said module to said reactor site; and installing at least the NSSS portion of said module in said containment building by passing said NSSS portion through said opening, anchoring said NSSS portion to said base mat, at least partially closing said opening with said bulkhead, and coupling said bulkhead reinforcing means to said containment building reinforcing means, with at least a portion of said reactor safeguard portion being disposed outside said containment building.

2. The method of claim 1, wherein the step of constructing further includes providing two construction openings on opposite sides of said containment building, a second construction opening opposite said first mentioned construction opening being dimensioned to accommodate the passage of said reactor safeguards portion of said module therethrough.

3. The method of claim 1, wherein said bulkhead is provided with containment penetrations and said step of installing further comprises connecting said containment penetrations to safeguards equipment disposed in said reactor safeguards portion.

4. The method of claim 1, wherein the steps of transporting and installing further comprises:

transporting said barge to the reactor site along a navigable waterway;

aligning a portion of said berge with said construction opening;

positioning said NSSS portion of said module in said containment building by floating the barge at least partially through said containment building.

5. The method of claim 2, wherein the steps of transporting said installing further comprise:

transporting said barge to the reactor site along a navigable waterway;

aligning said barge with said construction openings;

positioning said NSSS portion of said module in said containment building by floating said barge in through said first mentioned containment opening and at least partially through said containment building whereby said safeguards equipment portion extends through said second construction opening.

6. The method of claim 6, wherein the step of aligning further comprises:

moving the barge from said waterway into a canal having a holding basin, said canal being aligned with the at least one construction opening;

closing a dike between said canal and said waterway;

flooding said holding basin to raise the barge above the level of a base mat provided in the containment building;

floating the barge into position inside said containment building through said construction opening with said holding basin flooded; and lowering the level of said holding basin.

7. The method according to claim 5, wherein the step of aligning further comprises:

moving the barge from said waterway into a canal having a holding basin, said canal being aligned with said construction openings;

closing a dike between said canal and said waterway;

flooding said holding basin to raise the barge above the level of a base mat provided in said containment building;

floating the NSSS portion of said barge into position inside said containment building; and lowering the level of said holding basin.

8. The method of claim 7, wherein said module has fore and aft reactor safeguards portions, said NSSS portion being disposed therebetween, and said step of floating said NSSS portion further comprises:

positioning said barge with said fore and aft portions being disposed outside of said containment building.

9. A nuclear steam supply system (NSSS) module comprising:

a low draft barge having an NSSS portion and an associated reactor safeguards system portion, said NSSS portion being adapted to fit within a preformed containment building having a liner with at least one construction opening dimensioned to pass said NSSS portion therethrough;

said badge having at least one bulkhead separating said NSSS portion from said reactor safeguards systems, said bulkhead having a generally complementary geometry with respect to said construction opening and being formed to cooperate with said liner to close said construction opening;

said bulkhead containing preformed containment penetrations for communicating with said reactor safeguard system portion.

10. The method of claim 9, wherein said NSSS portion comprises at least a partially preformed pressurized water reactor (PWR).

11. The module of claim 9, wherein the barge has a draft of less than 30 feet.

12. The module of claim 9, wherein the barge has a draft of less than 15 feet.

13. The module of claim 9, wherein the barge has a draft of less than 10 feet.

14. The module of claim 13, wherein said barge has an overall length on the order of 400 to 700 feet and an overall width on the order of about 100 feet.

15. The module of claim 9, wherein said NSSS portion and said safeguards systems portion are separable at said bulkhead.

16. The module of claim 15, wherein said barge has a bottom deck and wherein a portion of said bottom deck is adapted to form a portion of said containment building liner.

17. The module of claim 16, wherein said NSSS portion comprises:

a primary shield wall;

a secondary shield wall generally coaxially disposed about said primary shield wall:

a refueling canal connected to said primary shield wall;

each of said walls being formed from structural steel and adapted to be filled with shielding material after said NSSS portion is positioned within said containment building.

* * * * *